Patented Jan. 9, 1934

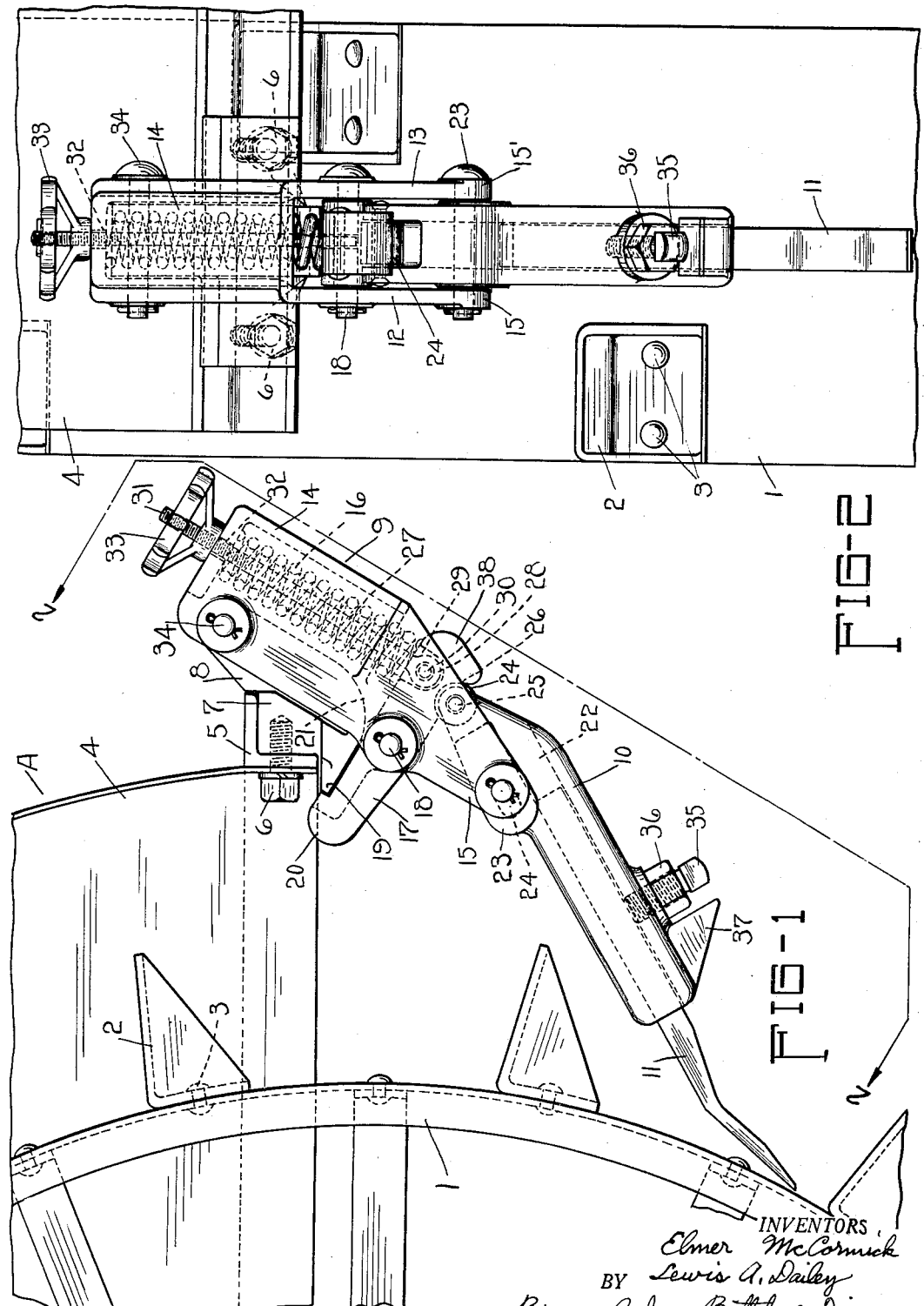

1,942,655

UNITED STATES PATENT OFFICE 1,942,655

TRACTOR

Elmer McCormick, Waterloo, and Lewis A. Dailey, Cedar Falls, Iowa, assignors to John Deere Tractor Company, Waterloo, Iowa, a corporation of Iowa Application November 1, 1929. Serial No. 403,980

22 Claims. (Cl. 280—158)

The present invention relates to tractors, particularly to those in which the traction or driving wheels are provided with lugs thereon, and aims primarily to provide an attachment therefor in the form of a new and improved wheel scraper.

For use under the usual operating conditions the ordinary farm tractors and other agricultural implements have drive wheels with lugs riveted or bolted thereto in order to provide sufficient traction, particularly when operating in mud or other soft earth. These lugs extend outwardly from the face of the drive wheel a substantial distance in order to have a deep driving engagement, this deep driving engagement being necessary for two reasons:

First, mud and other soft earth offer a considerably reduced frictional force if the drive wheels are smooth, and second, when operating in mud and soft earth, a much greater force is required to move the loads than over dry earth or pavements.

It has been discovered, however, that under certain conditions mud and dirt, sometimes with stones embedded therein, will accumulate on the wheels until the wheel is practically smooth, losing thereby all advantages of the driving lugs.

The principal object of our invention is to provide an improved wheel scraper for removing all matter tending to adhere to the drive wheels of tractors and other machines.

Another object of our invention is to provide an improved wheel scraper which is adapted to be automatically released in case an object is caught by the scraper which it cannot remove, such as a wedged stone.

A further object of our invention is to provide an improved wheel scraper which is adapted to be easily secured to the machine frame.

A still further object of our invention is to provide an improved wheel scraper so constructed and arranged that it is capable of being manually released.

Other and further objects will be apparent to one skilled in this art after a study of the annexed specification and drawing wherein:

Figure 1 is a side elevation of the device mounted in operative position on a tractor.

Figure 2 is a rear elevation looking slightly upward as indicated by the arrows 2—2 in Figure 1.

In the drawing, A represents the tractor generally, and 1 the left rear driving wheel having lugs 2 fixed thereto by rivets 3 and, as shown in Figure 2, in staggered relation and spaced a distance apart transversely of the wheel rim. The wheel is normally rotated in the direction of the arrow and is provided with the usual wheel guard or fender 4 supported in part by an angle iron 5 carried by or forming a part of the frame of the tractor. Detachably secured to the angle iron 5, as by stud bolts 6, is a bracket 7 having a rearwardly extending lug 8.

The wheel scraper is pivotally supported from the bracket 7 by a bolt 34 and is seen to comprise a housing or body member 9, a shank or fixture 10, and a scraping tool 11. The housing 9 consists of parallel side flanges 12 and 13 joined by a web portion 14 at the top and rear, as clearly indicated in Figure 1.

The side flanges of the housing member 9 are extended downwardly to form a pair of apertured ears 15 and 15' between which the socket member 10 is pivotally mounted as will be hereinafter described in detail, the upper corners of the side flanges 12 and 13 being apertured to receive the pivot pin 34.

The housing 9 encloses a compression spring 16 which, at its upper end, bears against the inner face of the top of web portion 14 and at its lower end against the outer arm of a latch member 17 carried between the ears 15 and 15' as by a pivot bolt 18. The opposite arm of the latch 17 extends forwardly of the housing member 9 and at its inner end is provided with a notch adapted to engage an abutment 19 on the bracket 7. The innermost or notched end of the latch 17 is rounded, as shown at 20 in Figure 1, to cooperate with the rounded portion 21 of the bracket 7 to allow the housing 9 to be easily and manually moved to operative position, the spring 16 acting on the outer end of the latch 17 to automatically rock the notched end thereof into latched engagement with the abutment 19.

The scraping tool 11 is adjustably secured in a socket or bore 22 formed in the fixture member 10 which is secured between the ears 15 and 15' for pivotal and sliding movement by a pivot pin 23, the member 10 having an elongated slot 24 receiving the pivot pin 23 and which thus allows both pivotal and sliding movement of the member 10 with respect to the housing 9.

The extreme inner end of the socket member 10 is forked to receive a roller 24' supported on a pin 25 carried by the forked end. This roller 24 is adapted to be received in a semi-circular recess 26 in the lower side of the rearwardly extending arm of the latch 17. The pivot pin 23 is carried by the ears 15 and 15' in such a position, relative to the pivot bolt 18 of the latch member 17, that the spring 16 acting through the latch member tends to urge the shank or fixture 10 and scraping tool 11 downwardly and forwardly so that the tool 11 is yieldingly retained in wheel engaging position.

The scraping tool 11 is adjustably held within the socket 22 by a set screw 35 threaded through the member 10 to securely engage the tool. The set screw 35 is provided with a lock nut 36 to prevent the set screw from working loose. The lower end of the fixture member 10 is provided with a rearwardly projecting lug 37 for the purpose of deflecting dirt scraped off the wheel by the tool 11 away from the set screw 35.

The latch member 17 may be retracted from its latched engagement with the abutment 19 on the bracket 7 by means which I will now describe. A link 27 having an eye 28 is pivoted to the outer end of the latch 17, the latter being provided with a recess 29 and a pin 30 to receive the eye 19. As shown in Figure 1, the link 27 is preferably arranged to pass upwardly through the spring 16 and is provided with an upper threaded end 31 which passes loosely through an aperture 32 in the top web portion 10 and which on its threaded end carries a hand wheel 33.

Thus, by tightening the hand wheel 33 the link 27 will be caused to move the latch member 17 in a counterclockwise direction whereby it is retracted from its engagement with the abutment 19. The housing 9, shank member 10, and tool 11 will thereupon be swung, as a unit, about the bolt 34 to a vertical position and entirely out of the way of the drive wheel 1. By simply removing the bolt 6, the device as a whole may be conveniently removed from the machine.

We consider the manual release feature an important part of our invention. It may be extremely convenient at times to be able to quickly release the scraper from operative position, both when the tractor is moving and when it is stationary, and the means I have provided enable this to be easily and conveniently accomplished. The engagement of the hand wheel 33 against the top of the housing 9 also serves as a stop for limiting the extent to which the latch 17 can be rotated clockwise by the spring 16 when the device has been tripped to released position; and, under some circumstances this hand wheel might be adjusted to slightly retract the latch 17 and thereby diminish the movement required to effect its release.

As is clear from Figure 2, the device is mounted so that the tool 11 will pass between the spaced lugs 2 on the drive wheel and, as pointed out above, the spring 16 yieldingly holds the tool downwardly and forwardly against the drive wheel so that the latter is cleared of all accumulated mud, grass, sticks, stones, or the like. In operation, as the tool 11 scrapes dirt and the like from the wheel 1 an upward force is exerted on the socket member 10 causing it to have a certain amount of sliding movement on the pivot pin 23, thereby rocking the latch 17 slightly in a counterclockwise direction as viewed in Figure 1, this movement being resisted, however, by the downward pressure of spring 16 on the outer arm of the latch.

The abutment 19 and the notched end of the latch 17 are so dimensioned that a slight rocking of the latch 17 is tolerated without releasing the latch from engagement with the abutment 19 on the bracket. However, should the tool 11 meet with an abnormal resistance, such as a stone wedged between two of the tractor wheel lugs, the continued forward travel of the tractor wheel would move the tool 11 and fixture member 10 upwardly, sliding the latter on the pivot 23, which would trip the latch from behind the abutment 19 and allow the housing 9 to rotate about pivot bolt 34 in a counter clockwise direction and out of operative position. If the tool 11 has become wedged between the obstruction and the tractor wheel, or for any other reason does not slide free of the obstruction, it will be carried upwardly as the wheel rotates. The roller 24 will cam out of the recess 26, permitting the tool 11 and member 10 to rotate clockwise with respect to the member 9 as far as is necessary to free itself from the obstruction.

To reset the scraper, the member 10 is rotated counter clockwise to engage the roller 24 within the notch 26, as shown in Figure 1. A camming surface 38 is provided at the outer end of the latch 17 against which the roller 24 may operate to cam the latch 17 counter clockwise sufficiently to permit the roller 24 to enter the notch or recess 26. After the socket member 10 has been reset, the device as a unit is swung inwardly in a clockwise direction about the pivot pin 34, the rounded end 20 of the latch 17 camming on the rounded portion 21 of the bracket 7.

Another feature of our invention which we deem of importance is the detachable and adjustable scraper tool 11. Thus, if a tool is broken it can simply and easily be replaced by backing out the set screw and inserting a new one, or if the tool wears and becomes shorter it is merely a matter of a few moments to loosen the set screw and readjust the scraper tool, and further, by being adjustable, the tool can be moved into proper position with respect to the drive wheel, thus our device can be used on machines having different sized wheels.

It will be noted that our device, including the scraper tool, is comparatively narrow. Thus, it is enabled to be used with wheels having the lugs close together; and also, by being narrow only a relatively small amount of force is required to dislodge dirt and the like from the driving wheels.

It will be apparent to those skilled in the art that the general construction of the device is susceptible of variations without departing from the spirit of the invention, and we do not intend to be limited to the details herein illustrated and described, but desire to avail ourselves of such variations and modifications as come within the scope of the appended claims.

We claim as our invention:

1. In apparatus of the class described, the combination with a drive wheel, a frame supported thereby, of a wheel scraper adapted to be connected with said frame, means adapted to be supported by said frame for holding the scraper in position, releasable means cooperating with the holding means and said scraper to automatically disconnect the latter from said holding means, and manually operated hand wheel and threaded link means for releasing said releasable means from said holding means.

2. In apparatus of the class described, the combination with a drive wheel, and a frame carried thereby, of a bracket carried by said frame, a body member carried by said bracket, a wheel scraper carried by said body member and adapted for scraping engagement with said wheel, latch means mounted on said body member for holding said scraper and said member in operative position, and means operative at will for releasing said latch means, said means including a latch and link pivotally connected thereto and extending through said body member and having a hand wheel screw threaded thereon externally of said body member.

3. A wheel scraper of the class described, comprising a pivotally mounted support, a scraper tool pivotally connected therewith, self operating releasable means cooperating between said support and the tool to hold the latter in operative position adjacent said wheel, and hand wheel and threaded link means connected with said releasable means for manually releasing the same.

4. A wheel scraper of the class described, comprising a scraper, pivotally supported means carrying said scraper, means carried by the pivotally supported means for holding said supporting means and said scraper in operative position, and hand wheel and threaded link means connected with said holding means for manually releasing said holding means.

5. A wheel scraper comprising a scraper tool, pivotally supported means carrying said tool, means carried by said pivotally supported means for holding said supporting means and said scraper in operative position, said holding means including latch mechanism, and manually operable hand wheel and threaded link means connected with said latch mechanism for releasing said latch mechanism.

6. A wheel scraper comprising a scraper tool, pivotally supported means carrying said tool, said means including a pivoted member to receive said tool, releasable means carried by said pivotally supported means for normally holding said supporting means and said member so as to dispose said scraper in operating position and manually operated means to release said releasable means, said means including a wheel.

7. A wheel scraper comprising, in combination a bracket, a scraping tool, means pivotally supporting said tool from said bracket, holding means connecting said supporting means and said bracket, said holding means having one end thereof releasably engaging said bracket to hold the tool in wheel engaging position, and manually operated hand wheel and threaded link means connected with the other end of said holding means to release the same from said bracket.

8. A wheel scraper of the class described comprising, in combination, a bracket, a body member pivotally supported by said bracket, a scraper tool carried by said body member and capable of movement relative thereto, latch means cooperating with said bracket for holding said tool and body member in operative position, said means being adapted to be released by relative movement between the tool and body member.

9. A wheel scraper comprising, in combination, a bracket, a body member pivoted to said bracket, a scraper tool carried by said body member and capable of sliding movement relative thereto, latch means engaging said bracket holding said body member and tool in operative position, and means actuated by said sliding movement for releasing said holding means.

10. A wheel scraper of the class described comprising, in combination, a bracket, a body member pivoted to said bracket, scraper means pivoted to said member and capable of bodily movement longitudinally thereof, means cooperating with said scraper means and said body member to hold said scraper means adjacent said wheel, and means to release said holding means.

11. A wheel scraper of the class described comprising, a bracket, a body member pivotally carried by said bracket, latch means pivotally carried by said body member, and wheel scraping means carried by said body member and capable of pivotal movement relative thereto, said latch means being adapted to cooperate with said bracket to hold the body member and said wheel scraping means in operative position, and means yieldingly restraining such relative movement, said latch means being adapted to be released by the relative movement between said body member and said wheel scraping means.

12. A wheel scraper of the class described comprising, a bracket, a body member pivotally carried by said bracket, latch means carried by said body member, wheel scraping means carried by said body member and capable of movement relative thereto, said latch means being adapted to cooperate with said bracket to hold the body member and said wheel scraping means in operative position, means yieldingly restraining such relative movement, said latch means being adapted to be released by such relative movement between said body member and said wheel scraping means, and manually actuated means operative at will to retract said latch means and release the body member and wheel scraping means from operative position.

13. A wheel scraper of the class described comprising, a bracket, a body member pivotally carried by said bracket, latch means carried by said body member, wheel scraping means carried by said body member and capable of movement relative thereto, said latch means being adapted to cooperate with said bracket to hold the body member and said wheel scraping means in operative position, means yieldingly restraining such relative movement, said latch means being adapted to be released by such relative movement between said body members and said wheel scraping means, and manually actuated means, comprising a link connected to said latch means and a hand wheel threaded on said link and abutting against said body member, and operative at will to retract said latch means and release the body member and wheel scraping means from operative position.

14. A wheel scraper of the class described, comprising a bracket, a housing pivotally carried by said bracket, wheel scraping means pivoted to said housing, a latch pivoted to said housing and provided with means to engage said wheel scraping means and said bracket, whereby the wheel scraping means will be held in operative position, spring means in said housing and adapted to retain said latch in engaged position, said wheel scraping means being adapted for substantially longitudinally bodily movement relative to said housing whereby the spring is depressed and the latch released.

15. A wheel scraping device of the class described, comprising a bracket, a housing pivoted at its upper end to said bracket and adapted to be swung to a vertical position by gravity, wheel scraping means pivotally carried by said housing, said means being capable of movement relative to said housing, latch mechanism carried by said housing and adapted to engage said bracket and hold said housing and said wheel scraping means when swung forwardly in operative wheel scraping position, said latch means being adapted to be released by said relative movement, whereby the wheel scraping means will be swung to an inoperative position if an obstruction is encountered which cannot be removed.

16. A wheel scraper including a bracket, a housing pivoted thereto, wheel scraping means pivotally carried by said housing, a latch connected to said housing and adapted to engage said bracket whereby the housing and wheel scraping means are held forwardly and in wheel scraping position, a spring yieldingly retaining said latch in engaged position, said latch and wheel scraping means having cooperative surfaces whereby said latch may be disengaged from the bracket by relative movement between the housing and said wheel scraping means.

17. A wheel scraper comprising, a bracket, a housing pivotally carried thereby, a latch pivoted to said housing, wheel scraping means pivoted to said housing, said latch having a notch adapted to receive the inner end of said scraping means, said latch also having a notch adapted to engage an abutment carried by said bracket, spring means biasing said latch for engagement with said wheel scraping means and said abutment, said latch having a cam surface whereby pivotal movement of the wheel scraping means to said housing will retract said latch from abutment engaging position.

18. In a wheel scraper of the class described, the combination of a scraper tool, a fixture member therefor, means pivotally supporting said fixture and tool in wheel scraping position, fastening means carried by said fixture for fixedly securing said tool thereto in adjusted positions, and means carried by said fixture member for deflecting dirt and the like away from said securing means.

19. A wheel scraper of the class described comprising a bracket, a body member pivotally carried by said bracket, latch means carried by said body member, wheel scraping means carried by said body member and capable of movement relative thereto, said latch means being adapted to cooperate with said bracket to hold the body member and said wheel scraping means in operative position, and means yieldingly restraining such relative movement, said latch means being adapted to be released by such relative movement between said body member and said wheel scraping means.

20. A wheel scraper of the class described comprising a bracket, a body member pivotally carried by said bracket, latch means pivotally carried by said body member, wheel scraping means carried by said body member and capable of movement relative thereto, said latch means being adapted to cooperate with said bracket to hold the body member and said wheel scraping means in operative position, means yieldingly restraining such relative movement, said latch means being adapted to be released by such relative movement between said body member and said wheel scraping means, and manually actuated means operative at will to retract said latch means and release the body member and wheel scraping means from operative position.

21. A wheel scraper of the class described comprising a bracket, a scraper tool, housing means pivotally connected to said bracket and carrying said tool, said means including a member pivotally supported thereto to receive said tool and capable of relative movement therewith, and means on said housing means cooperating with said bracket for holding said housing means and member and tool in wheel scraping operative position, said relative movement of the pivotally supported tool receiving member releasing said means holding said housing means and member and tool in operative position.

22. A wheel scraper of the class described comprising, in combination, a bracket, a body member pivoted to said bracket, a scraper tool carried by said body member and movable with respect thereto, and latch means pivoted to the body member and adapted to engage said bracket and said scraper tool to hold the body member in fixed position relative to the bracket and the scraper tool in position relative to said body member.

ELMER McCORMICK.
L. A. DAILEY.

CERTIFICATE OF CORRECTION.

Patent No. 1,942,655. January 9, 1934.

ELMER McCORMICK, ET AL.

It is hereby certified that error appears in the printed specification of the above numbered patent requiring correction as follows: Page 2, lines 140 and 141, claim 1, strike out the words "hand wheel and threaded link"; and that the said Letters Patent should be read with this correction therein that the same may conform to the record of the case in the Patent Office.

Signed and sealed this 20th day of February, A. D. 1934.

F. M. Hopkins (Seal) Acting Commissioner of Patents.